United States Patent Office 3,227,164
Patented Jan. 4, 1966

3,227,164
TOBACCO SMOKE FILTER
George P. Touey and Wayne V. McConnell, Kingsport, Tenn., assignors to Eastman Kodak Company, Rochester, N.Y., a corporation of New Jersey
No Drawing. Filed July 23, 1963, Ser. No. 296,913
2 Claims. (Cl. 131—208)

This invention relates to an improved plasticizer-type bonding agent for filament filters and to filters containing same. In particular, it relates to the addition of such improved plasticizer-type bonding agent to a tobacco smoke filter made from a crimped filament tow to bond the filter and enhance its capacity for removing phenols and other compounds from the tobacco smoke.

Filters from crimped tows of cellulose esters such as cellulose acetate and the like fibers are well known to the art and have been described in many patents. For example, U.S. Patent 2,794,239 of our coworkers Crawford and Stevens describes such a filter, and their U.S. Patent 3,017,309 describes an improved method for making such a filter. Disclosures of filters containing various additives include the following U.S. patents:

| | | |
|---|---|---|
| 2,881,769 | 2,940,456 | 3,008,474 |
| 2,881,771 | 3,003,504 | 3,026,226 |
| 2,904,050 | 3,008,472 | 3,033,212 |
| 2,928,400 | 3,008,473 | |

The filters described in all of these patents have pronounced advantages over filters made of paper, cotton, and the like fibers of a loose noncontinuous form such as staple fibers. Among these advantages is the rapidity at which they may be continuously manufactured from a large bale or roll of a tow of crimped continuous fibers. Another advantage is the ease at which the crimped continuous fibers in the filter may be fused together at random spots by the application of a nontacky, non-volatile, organic ester-type plasticizer to the opened or bloomed-out tow while it is being processed into filter rods. This fusing or bonding of the fibers at random spots results in a filter rod of a rigid but still porous structure. Such a technique of using a nontacky, nonvolatile plasticizer to produce a rigid filter has obvious advantages over the addition of a tacky water-based or solvent-based adhesive to produce a rigid filter structure. Adhesives produce a tacky surface on the fibers in the tow. This, in turn, results in the tow adhering to various parts of the filter rod-making machine during processing. Also, they require the elimination of water or an organic solvent, a step which is quite difficult considering the speed at which filter rods must be made in order to be economical.

In many instances, the organic acid ester-type plasticizer which is used as the bonding agent for crimped tow filters of cellulose acetate is a glyceryl compound. This is because such a relatively high boiling liquid is capable of bonding the fibers in the filter at random spots along the filter at room temperature. Thus, in this respect it is an improvement over other inexpensive plasticizers such as the low-molecular-weight alcohol esters of phthalic acid and certain propionate or butyrate esters. Such esters require a heat curing step to produce a rigid cellulose acetate tow filter after they are applied to the tow and the filter rod has been prepared.

While because of these advantages the application of certain esters to a cellulose acetate tow-type of filter to produce a rigid structure has become usual in the industry, such prior art plasticizers do exhibit some properties which could be improved upon. For example, some of the prior art plasticizers may sometimes diffuse into the fibers more rapidly than desired after the filter rod is prepared. This, in turn, may represent a slight loss in bonding capacity. If the plasticizer is within the fiber and no longer on its surface, its ability to function as a bonding agent is weakened. Although sufficient plasticizer may remain on the surface of the fibers to cause the desired fusing together of fibers at random spots, internal diffusion may sometimes require use of an increased amount of plasticizer. That is, there is room for an increase in efficiency by prevention of possible occasional waste or loss of fusing ability by such diffusion. Thus, development of a room-temperature bonding type of plasticizer which would remain at least partially on the surface of the fibers for a considerable length of time represents a highly desirable result.

Another property of prior art plasticizers in which there is room for improvement is the relatively long time required to bond the filter into a rigid structure. For example, it sometimes requires as much as two hours at room temperature for a freshly prepared cellulose acetate tow filter containing about 10% of certain plasticizers to become rigid. This curing time may tend to cause oval-shaped rods to form in the filter rod collection trays at the end of the filter rod-making machine commonly placed in a vertical position such that the filter rods are stacked on top of each other in layers. Thus, the pressure of the weight of the rods in a full tray may cause the bottom layers of rods to be distorted of they do not first develop sufficient rigidity to resist distortion.

One object of this invention is to disclose a more rapid room-temperature bonding plasticizer for a filament tow type of filter. Another object is to disclose a room-temperature bonding plasticizer which diffuses within the fibers of a cellulose acetate filter at a limited rate. A further object is to disclose a plasticizer-hardened cellulose acetate tow filter which selectively removes a high amount of phenol after aging. A still further object is to disclose a substantially tasteless plasticizer which is capable of bonding a filament filter into a rigid structure at room temperature. Another object is to disclose a room-temperature bonding plasticizer which is not vaporized from the filter during the smoking of a filter cigarette. Still another object is to disclose a rigid filter the fibers of which are bonded by a plasticizer hardening agent and may have an acetyl content of as high as 43–44.6%.

In its broader aspects our invention involves the use of the acetoacetic acid esters of glycerine and certain mono and poly(alkylene glycols), preferably the reaction product of a glycol such as propylene glycol with diketene, as bonding agents for fibrous filters. These acetoacetic acid esters have been found to be rapid room-temperature (25–30° C.) bonding agents, especially in the case of cellulose ester filters. They are also substantially tasteless and, due to their high boiling points, do not volatilize from the filters while filter cigarettes are being smoked. They have also been found to be capable of imparting to the cellulose acetate tow filter a high and permanent capacity for removing phenol from tobacco smoke. Although we do not wish to be bound by any particular theory, it is thought this latter property of our liquid esters may be because they are not rapidly absorbed into the cellulose acetate fibers of the filter. Thus, a considerable portion of these nonvolatile liquids appears to remain on the surface of the fibers where it is more effective in fusing the fibers together at random points and where it is available to function as solvent or coordinating agent for the phenol in the smoke.

While we do not wish to be bound by any particular theory as to the high phenol-removing ability of the filters of our invention, it appears that these compounds may form complexes with the phenol through the interaction of the phenolic hydroxyl group with the carbonyl groups of the acetoacetic acid ester. For example, the presence of two carbonyl groups in the acetoacetyl radical

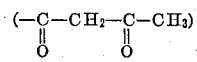

of the esters of our invention appears to enhance this phenol coordinating action.

These acetoacetic acid esters of glycerine and certain alkylene glycols and poly(alkylene glycols) have also been found to be excellent bonding agents for filters of cellulose triacetate.

With regard to the acetoacetic acid esters of glycerine, the number of acetoacetate groups present in the ester should be two and preferably three. In other words, either glyceryl diacetoacetate or triacetoacetate may be used. The triacetoacetate of glycerine,

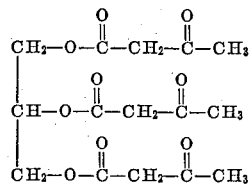

is a preferred glycerol ester.

Regarding the alkylene glycol and poly(alkylene glycol) esters of acetoacetic acid, the preferred glycols are the mono- and poly-ethylene and propylene glycols. Of the polyethylene and polypropylene glycols, preferred are those with a molecular weight below 1000. This includes the di-, tri-, tetra-, penta-, and hexa-ethylene and propylene glycols. These high-boiling acetoacetic acid esters are highly effective in removing phenol and other undesirable components in ciagrette smoke such as trace amounts of toxic metal ions such as nickel, cobalt, etc. The structural formulas for the acetoacetic acid esters of ethylene glycol and propylene glycol are shown below:

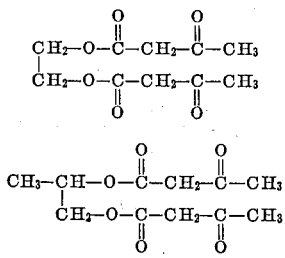

These acetoacetic acid esters may be prepared by any convenient method. One particularly simple and economical procedure is to react diketene with the glycol in the presence of a tertiary amine catalyst, as illustrated by the reaction of propylene glycol with diketene as follows according to a preferred embodiment of our invention:

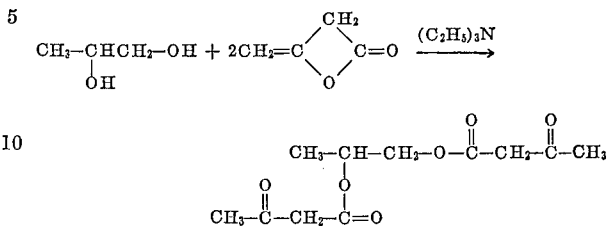

The acetoacetic acid ester bonding agents may be applied to the filters in any convenient manner while the filters are being fabricated from the crimped cellulose acetate or cellulose triacetate tows. Thus, they may be sprayed on the bloomed tow just prior to the point where the tow is recompacted and pulled through a paper wrapping assembly of a filter rod-making machine. Another way of adding these high-boiling liquid bonding agents to the tow is to employ a wicking device which wipes the desired amount of the liquid on the bloomed tow. The amount of acetoacetic acid ester-type bonding agent which may be added to the tow according to our invention is from 4 to 15% by weight of the filter. The preferred amount is 5 to 10%.

The following examples are illustrative of our invention.

*Example I*

A 10-ft. section from a continuous tow of 12,000 cellulose acetate filaments of 5 denier per filament and crimped to 12 crimps per inch was spread out to a width of 12 inches and sprayed with propylene glycol diacetoacetate until it contained 7% of the bonding agent. It was then processed into filter rods on a cigarette filter rod-making machine. Another 10-ft. section of the tow was spread out to a width of 12 inches and sprayed with a prior art plasticizer. The section which contained prior art plasticizer was also processed into filter rods on the cigarette filter rod-making machine. The rods containing the propylene glycol diacetoacetate became rigid within 30 minutes. Those containing the prior art palsticizer required a curing time of 2 hours at room temperature before they were as rigid as the rods containing the acetoacetic acid ester. The prior art plasticizer imparted a definite taste to the rods, whereas the propylene glycol diacetoacetate rods had no objectionable taste.

Filter tips (17 mm.) were cut from both sets of rods and attached to king-size cigarettes which had been shortened to 68 mm. to compensate for the length of the filter. These filter cigarettes (85 mm. in length) were smoked on an automatic smoking machine to butt lengths of 23 mm. and the smoke condensate was collected in empty traps submerged in Dry Ice-isopropanol. The collected smoke condensate from 200 of each of these filter cigarettes was analyzed for phenol content according to the method described by D. Hoffmann and E. L. Wynder in Beitrage zur Tobakforschung Heft, vol. 3, pp. 101–106. The amount of bonding agent present in the smoke condensates was also determined using a gas chromatographic procedure.

Another set of filter rods as prepared from the same filter tow and in the same manner as described above with the exception that no bonding agent was applied to the tow. These soft rods were cut into 17 mm. filters and also tested for their capacity for removing phenol from the king-size cigarette smoke. The results obtained for these 3 sets of filter rods are listed in the following table.

| Filter (17 mm.) | Filter Pressure drop,[2] inches | Phenol/cigarette found in smoke, μg. | Bonding agent/cigarette found in smoke, μg. |
|---|---|---|---|
| 5 [1] den./fil. cellulose acetate fibers, no bonding agent | 1.6 | 50 | |
| 5 den./fil. cellulose acetate fibers containing 10% prior art plasticizer | 1.7 | 26 | 450 |
| 5 den./fil. cellulose acetate fibers containing 7% propylene glycol diacetoacetate | 1.7 | 21 | 50 |

[1] Den./fil.=denier per filament.
[2] Pressure drop recorded in inches of water at air flow rate of 17.5 ml./sec.

As a control, 200 of nonfilter king-size cigarettes (85 mm. in length) were smoked to 23 mm. butt lengths and the collected smoke condensate was analyzed for its phenol content and found to have an average of 140 μg. phenol per cigarette.

The three groups of filters were then retested in a similar manner after they had been stored for 8 weeks at room temperature. As a control, another set of 200 nonfilter cigarettes was smoked. The results as to phenol removal were as follows:

```
                                                 g. phenol-cigarette
Nonfilter cigarettes _____   145
Cigarettes containing filter without bonding agent __   52
Cigarettes containing filter with 10% prior art plas-
  ticizer _____    45
Cigarettes containing filter with 7% propylene glycol-
  diacetoacetate _____    24
```

These smoking tests show that the cellulose acetate control filter without a bonding agent removed 64% of the phenol, whereas the filters with prior art plasticizers and the propylene glycol diacetoacetate bonding agents removed 81% and 85% respectively. The results also show that after 8 weeks' storage the prior art plasticizer treated filters removed 69% phenol while the propylene glycol diacetoacetate-treated filters removed 83% phenol. Thus, the propylene glycol diacetoacetate filters removed as much phenol after they had aged 8 weeks as they did when they were made although the prior art treated filters showed a significant drop in phenol removal after 8 weeks.

*Example II*

The following esters were prepared by reacting diketene with the appropriate glycol in the presence of a catalytic amount of triethylamine.

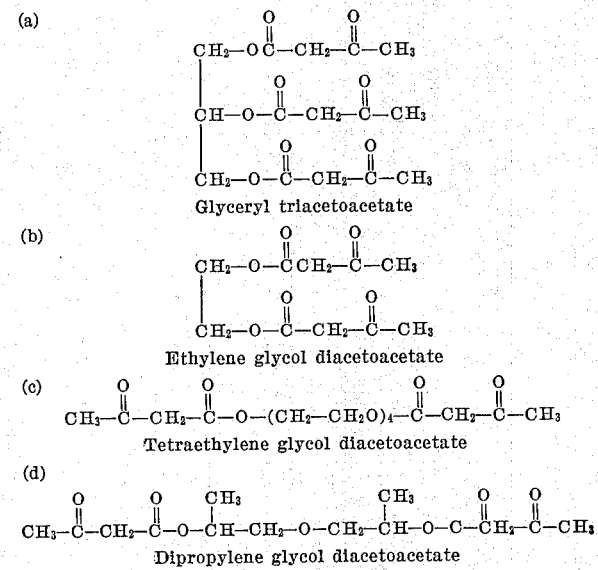

All of these high-boiling liquids had a bland taste. Cellulose acetate tow filters containing 7% of these plasticizers became firm within 30 to 40 minutes, whereas the same type of filters containing 7% triacetin were still soft within this time interval. Smoking tests revealed that all of the filters containing the acetoacetate bonding agents gave a high and permanent level of phenol removal after 10 weeks' storage at room temperature. The filters containing prior art bonding agent gave a high level of phenol removal when freshly prepared, but on storage (10 weeks) a definite drop in the phenol removal value was observed. Following is a tabulation of the results.

| Crimped tow filter (17 mm.) | Percent tar removed | | Percent phenol removed | |
|---|---|---|---|---|
| | At start | 10 weeks | At start | 10 weeks |
| (a) 20,000 fibers of 2 den./fil | 40 | 41 | 76 | 74 |
| (b) 17,200 fibers of 3.2 den./fil | 32 | 34 | 70 | 71 |
| (c) 16,000 fibers of 5 den./fil | 25 | 26 | 65 | 67 |
| (d) Filter (a) plus 7% glyceryl triacetoacetate | 41 | 42 | 90 | 89 |
| (e) Filter (b) plus 7% glyceryl triacetoacetate | 33 | 33 | 87 | 84 |
| (f) Filter (c) plus 7% glyceryl triacetoacetate | 27 | 26 | 82 | 83 |
| (g) Filter (a) plus 7% ethylene glycol diacetoacetate | 39 | 40 | 92 | 90 |
| (h) Filter (b) plus 7% ethylene glycol diacetoacetate | 32 | 34 | 87 | 85 |
| (i) Filter (c) plus 7% ethylene glycol diacetoacetate | 27 | 26 | 85 | 84 |
| (j) Filter (a) plus 7% tetraethylene glycol diacetoacetate | 41 | 42 | 92 | 90 |
| (k) Filter (b) plus 7% tetraethylene glycol diacetoacetate | 34 | 31 | 86 | 84 |
| (l) Filter (c) plus 7% tetraethylene glycol diacetoacetate | 22 | 24 | 80 | 80 |
| (m) Filter (a) plus 7% dipropylene glycol diacetoacetate | 44 | 41 | 88 | 86 |
| (n) Filter (b) plus 7% dipropylene glycol diacetoacetate | 33 | 33 | 85 | 84 |
| (o) Filter (c) plus 7% dipropylene glycol diacetoacetate | 23 | 25 | 81 | 80 |
| (p) Filter (a) plus 7% glyceryl triacetate | 45 | 42 | 89 | 77 |
| (q) Filter (b) plus 7% glyceryl triacetate | 33 | 33 | 87 | 77 |
| (r) Filter (c) plus 7% glyceryl triacetate | 26 | 25 | 80 | 71 |

All of the filter cigarettes tested as per the preceding table were 85 mm. in length. They were prepared from the same king-size nonfilter cigarettes as described in Example I and were smoked to 23 mm. butt lengths. The average pressure drops for the filters in inches of water ranged from 1.6 for 5 den./fil. filter to 2.2 for the 2 den./fil. filter. The tar removal values were obtained by the published photofluorometric procedure "Evaluation of Cigarette Filter Efficiency by Photofluorometry," W. V. McConnell, R. C. Mumpower, and G. P. Touey, Tobacco Science, 4 pp. 55–61 (1960).

*Example III*

This example illustrates the hardening or bonding ability of the acetoacetic acid esters listed in Examples I and II as opposed to that of triacetin. A tow of 16,000 crimped continuous fibers of cellulose triacetate (43.9% acetyl content) was cut into 10-ft. lengths. One of these segments was processed into filter rods in the usual manner using a rod-making machine. The others were sprayed with different plasticizers as indicated in the following table until they contained 8% plasticizer prior to processing into filter rods. In all cases the rods were 25.2 mm. in circumference.

| Plasticizer bonding agent used | Filter rod hardness | | |
| --- | --- | --- | --- |
| | After 30 min. | After 2 hr. | After 24 hr. |
| No plasticizer | Very soft | | |
| Prior art plasticizer | do | Soft | Soft. |
| Glycerol triacetoacetate | Firm | Firm | Rigid. |
| Ethylene glycol diacetoacetate | do | Rigid | Do. |
| Propylene glycol diacetoacetate | do | do | Do. |
| Tetraethylene glycol diacetoacetate | Semifirm | Firm | Do. |
| Dipropylene glycol diacetoacetate | do | do | Do. |

It should be apparent from the foregoing description and examples that we have provided a novel tobacco smoke filter of increased phenol removal ability as well as early-instilled and long-lasting rigidity, said filter containing as plasticizer bonding agent a small amount of an acetoacetic acid ester of glycerol or a mono- or poly-ethylene or propylene glycol.

The invention has been described in detail with particular reference to preferred embodiments thereof, but it will be understood that variations and modifications can be effected within the spirit and scope of the invention as described hereinabove and as defined in the appended claims.

We claim:

1. A tobacco smoke filter adapted to remove certain undesirable components from tobacco smoke, said filter being comprised of a bundle of continuous filaments selected from the group consisting of cellulose acetate and cellulose triacetate carrying thereon a plasticizer bonding agent selected from the group consisting of the alkylene glycol and polyalkylene glycol esters of acetoacetic acid and a wrapper around the circumference of said bundle.

2. A tobacco smoke filter adapted to remove certain undesirable components from tobacco smoke, said filter being comprised of a bundle of continuous filaments selected from the group consisting of cellulose acetate and cellulose triacetate carrying thereon as a plasticizer bonding agent an acetoacetic acid ester of glycerol and a wrapper around the circumference of said bundle.

References Cited by the Examiner

UNITED STATES PATENTS 2,815,760 12/1957 Schreus et al. _____ 131—208
2,886,591 4/1959 Lautenschlager et al. 252—430
2,953,838 9/1960 Crawford et al. _____ 131—208

SAMUEL KOREN, *Primary Examiner.*

MELVIN D. REIN, *Examiner.*